Patented Apr. 19, 1938

2,114,837

UNITED STATES PATENT OFFICE 2,114,837

METHOD OF RESISTANCE BUTT WELDING

Robert T. Gillette, Scotia, N. Y., assignor to General Electric Company, a corporation of New York No Drawing. Application June 24, 1936,
Serial No. 87,009

3 Claims. (Cl. 219—10)

My invention relates to resistance butt welding and more particularly to the joining of aluminum and copper parts by a resistance butt welding operation.

The difficulty in producing a welded union between aluminum and copper parts resides primarily in obtaining a joint of suitable mechanical strength. During the welding operation a brittle copper-aluminum alloy is formed at the weld which produces a joint of low strength and ductility.

It is an object of my invention to provide an improved butt welding procedure by means of which satisfactory welded joints may be formed between aluminum and copper parts.

My invention will be best understood from a consideration of the procedure employed, which is as follows:

The aluminum and copper parts to be welded are placed in the jaws of a butt welding machine and their ends are brought together with sufficient pressure to prevent arcing and spattering of metal at the joint when a welding current is passed through them. Unless the ends of the parts make a good engagement with one another it will be difficult to accomplish this result. While maintaining this pressure a welding current is passed through the parts to bring their ends at the joint to a welding temperature. In order to equalize the heating effect of this welding current in the ends of the parts it may be necessary to have the parts projecting from the jaws of the welding machine unequal distances. The copper part, by reason of its lower electrical resistance, will generally project from the jaws of the welding machine a greater distance than the aluminum part. After the ends of the aluminum and copper parts have been brought to a welding temperature the weld is completed by interrupting the flow of welding current and immediately or at the same time pushing the parts together to force from between them all but a very thin layer of the copper-aluminum alloy formed during the welding operation. The smaller the film of copper-aluminum alloy remaining between the parts at the weld the greater will be the strength of the weld. The parts should be forced together with such pressure that this film is very thin and preferably less than a thousandth of an inch in thickness. A very successful weld has been made where the width of this film was about three-tenthousandths of an inch in thickness.

The push-up pressure employed is considerably greater than the pressure used during the heating period of the welding operation. When a hand welding operation is performed the operator first bumps the parts forcibly together several times in order to obtain a good surface contact between the parts. This prevents arcing and spattering which would occur if these parts engaged one another imperfectly. The heating period of the welding operation is then performed while the operator holds the parts together with a light pressure while supplying welding current therethrough. A fairly light hand on the lever by means of which pressure is exerted on the work parts will be sufficient for this purpose. The weld is completed by the operator fairly throwing himself against the pressure lever and simultaneously interrupting the flow of welding current. The welding current may be interrupted automatically in response to the push-up at the end of the welding operation. The great pressure at push-up is used to force from between the parts practically all of the copper-aluminum alloy formed during the welding operation.

The welding operation is completed in a very short period of time, usually less than a second, and the pressures employed for completing the weld will depend on and of course vary with the size of the parts being united. Likewise the initial pressure between the parts during the heating portion of the welding operation will vary with the amount of welding current employed and the size and condition of the parts being heated. In view of these variables it is not possible to give definite pressures employed for heating the parts to a welding temperature and for completing the weld by producing an upset which carries from between the parts substantially all of the copper-aluminum alloy formed during the welding operation. However, if the procedure above disclosed is followed, keeping in mind the results to be obtained, a welding operator will be enabled to produce between aluminum and copper articles welds of superior quality which are possessed of a ductility and strength rendering the assembly suitable for practically every use to which it may be put.

What I claim as new and desire to secure by Letters Patent of the United States is:

1. The method of resistance butt welding an aluminum part to a copper part which comprises bringing the abutting ends of said parts to a welding temperature by passing a welding current therethrough while maintaining a light pressure between said parts sufficient to prevent arcing and spattering of metal at the joint between them and completing the weld by interrupting the flow of welding current and pressing said parts together to force from between said parts all but a very thin layer of the copper-aluminum alloy formed during the welding operation.

2. The method of resistance butt welding an aluminum part to a copper part which comprises bringing the ends of said parts together with a light pressure sufficient to prevent arcing and spattering of metal at the joint between them when a welding current is passed through said joint, bringing the abutting ends of said parts to substantially the same welding temperature by passing welding current through them while maintaining said pressure, and completing the weld by simultaneously interrupting the flow of welding current and pushing said parts together to force from between said parts all but a very thin layer of the copper-aluminum alloy formed during the welding operation.

3. The method of resistance butt welding an aluminum part to a copper part which comprises providing a good surface contact between the ends of said parts, placing the ends of said parts together with a light pressure sufficient to prevent arcing and spattering of metal at the joint between them when a welding current is passed through said joint, bringing the abutting ends of said parts to a welding temperature by passing welding current through them while maintaining said pressure, interrupting said flow of welding current when said parts have attained a welding temperature and immediately forcing said parts together with sufficient pressure to expel all but a layer less than a thousandth of an inch in thickness of the copper-aluminum alloy formed between them during the welding operation.

ROBERT T. GILLETTE.